3,449,130
METHODS FOR TREATING CEREAL BRANS
Etienne Marie Joseph Blanchon, Paris, France, assignor to Biscuits Brun, Maisons-Alfort, Val-de-Marne, France, a corporation of France
No Drawing. Filed Mar. 16, 1966, Ser. No. 534,665
Claims priority, application France, Mar. 25, 1965, 10,654
Int. Cl. A23l 1/10
U.S. Cl. 99—80     3 Claims

ABSTRACT OF THE DISCLOSURE

Treating cereal brans to extract therefrom nutritive and active components, by allowing the cereal brans to macerate in a suitable maceration liquid to extract therefrom a quantity of pectinolytic enzymes sufficient for performing the subsequent steps of the treatment, grinding the bran to a mesh size of less than 60, introducing said finely ground bran into a suitable liquid, such as water or skim milk, to form a paste, the pH of which is between 6–7, subjecting said paste to the action of the previously released pectinolytic enzymes, converting the thus treated paste into an aerosol, and drying the aerosol.

---

The present invention relates to a method of treating vegetable tissues, and more particularly a method of treating vegetable tissues with a view to extract therefrom the nutritive and active components for their subsequent use as agents for improving foods for human as well as animal beings, and also for plants.

The applicant achieved the scope set forth hereinabove by carrying out the method disclosed in the United States patent application Ser. No. 191,666, filed Apr. 23, 1962, now Patent No. 3,255,015 which has for its object the extraction of the nutritive and active components of vegetable tissues by subjecting these tissues to a continuous treatment consisting in recycling a liquid product having a high content of enzymes and other active substances, obtained as a consequence of the treatment of an initial batch, or preceding batches, of vegetable tissues with enzymes.

The applicant, in this preceding U.S. patent application disclosed the treatment of the vegetable tissues of the initial batch by means of pectinolytic enzymes either of fungus or bacterial origin, or derived from cereal brans according to the method described in the U.S. patent application Ser. No. 257,102 filed Feb. 8, 1963, now Patent No. 3,262,783.

It is the object of the present invention to provide an improved method of treating vegetable tissues which is more capable of meeting the requirements of modern practice than hitherto known methods having the same scope, notably in that it permits on the one hand of performing in a same and single operation the separation of the nutritive and active elements from the cellulose residue, together with the dehydration of these elements, and on the other hand of dispensing with any exogenous addition of enzymes.

Consequently, it is the object of the present invention to provide a method for treating vegetable tissues which is characterized in that the vegetable tissues to be treated are allowed to macerate in a suitable macerating liquid in order to release therefrom a quantity of pectinolytic enzymes sufficient for carrying out the next step of the treatment, in that the vegetable tissues to be treated by the thus extracted pectinolytic enzymes, are introduced into a suitable liquid, after having been previously ground to a very fine particle size of less than the 60 mesh size, thus forming a paste which is subjected to the action of the aforementioned pectinolytic enzymes released during the macerating stage, and in that the treated paste obtained is converted into an aerosol which is subsequently dried.

According to an advantageous provision of this invention, the vegetable tissues to be treated are caused to macerate in a liquid such as water or an aqueous physiological solution, in order to release the pectinolytic enzymes therefrom.

According to another advantageous feature of this invention the finely ground vegetable tissues are introduced into a liquid such as water, skim milk or whole milk, lactoserum, etc. . . . in order to form a paste subsequently treated with the pectinolytic enzymes at a pH value ranging from 6 to 7.

According to a third advantageous provision of this invention, the vegetable tissues subjected to the treatment according to this invention consist of very finely ground cereal brans having a mesh size not exceeding 60, for instance.

Other provisions and features will become apparent as the following description proceeds.

This invention contemplates more particularly the methods of treating vegetable tissues according to the features and characteristics set forth hereinabove, as well as the products obtained by carrying out these methods, and the elements necessary for carrying out these methods.

This invention will be better understood from the complementary description given hereinafter in connection with a perferred form of carrying this invention into effect.

Of course, this example should not be construed as limiting the scope of the invention since it is given by way of example only.

EXAMPLE (1) The grinding step may be carried out either in a liquid medium such as water, skim milk, lactoserum, etc., or in a dry medium, by using any suitable means such as colloidal grinders, disc grinders, whirling disintegrators, etc.

Whether the grinding step is carried out in a liquid medium or in the dry state, the ground vegetable tissues, which in the present example are brans, are mixed with the proper quantity of the selected liquid so that at last the mixture constitutes a paste adapted to be converted into an aerosol: thus, 40% of dry substances may be used with most of the hitherto known drying turbines operating by atomization.

(2) Then the bran is subjected to the enzymatic action in a second stage of the process by adhering to the technique set forth in the aforesaid U. S. patent application Ser. No. 191,666 (now Patent No. 3,255,015), which comprises subjecting said cereal brans to enzymatic action whereby the cellulose is degraded and enzymes are liberated, separating the so-obtained mixture into a filtrate and a cellulose residue, separating the so-obtained filtrate into a pectinolytic enzyme-rich supernatant liquid and a residue, and recycling and mixing the pectinolytic enzyme-rich supernatant liquid with a fresh batch of the cereal brans, thereby releasing the enzymes and nutritive constituents contained in said cereal brans.

(3) In a third stage the paste obtained at the end of the preceding or second stage is converted into an aerosol and the mist thus obtained is caused to contact a stream of heated air according to the technique and by means of the devices resorted to for the atomization drying step. The cellular cellulose residues on the one hand, and the nutritive residues (which are considerably finer than the former, for example a 60-mesh granulometry for the former and a 100-mesh granulometry for the latter) on the other hand, are transformed into aerosol droplets having likewise very different dimensions due to the difference in size of the condensation nuclei, whereby the nutritive elements are released by evaporation before the cellulose particles are. Moreover, agglomerates build up between the larger, still uncompletely evaporated, cellulose particles, without any participation of the dry particles.

In drying apparatus of the atomization types normally used in industry, the fines separated in cyclone separators consist nearly exclusively, in the present case, of nutritive and active substances.

(4) In a fourth stage, the larger particles and the agglomerates, on the one hand, and the fine dried particles, on the other hand, are separated for example by a gravimetric process or through other suitable means. More particularly, if a conventional atomization drying installation is used, the greater part of the nutritive and active elements is recovered by means of the fine suction pipe from the cyclone separators, the remaining fraction being collected, together with the cellulose residue, from the normal extraction orifice at the bottom of the drying towers.

Of course, any other devices capable of producing the the desired result may be used.

(5) In a fifth stage a separator such as densimetric tables may be used for producing a more complete separation of the nutritive and active elements, in case these were partially precipitated with the cellulose residues.

From the above description it appears clearly that, irrespective of the specific forms of emboidment contemplated, methods of treating vegetable tissues are obtained which, in comparison with hitherto known methods serving the same purposes, afford considerably better results, notably that of allowing to perform in a same and single process not only the separation of the filtrate from the cellulose residue but also the drying of the products dissolved or in suspension in the filtrate and also of the component elements of the cellulose residue, without altering the properties of the dried products, while faciliating to a substantial degree the starting stage of the process.

As will be readily understood from the foregoing, this invention should not be construed as being limited by the specific forms of embodiment and/or application, described in detail or suggested hereinabove, since many modifications may be brought thereto without departing from the spirit and scope of the invention as set forth in the appended claims.

What I claim is:

1. A method of treating cereal brans to extract therefrom nutritive and active components, which comprises the steps of allowing said cereal brans to be treated to macerate in a suitable maceration liquid for a period of time sufficient to extract therefrom a quantity of pectinolytic enzymes sufficient for performing the subsequent steps of the treatment, grinding said cereal brans to be treated to a very fine mesh size of less than 60, introducing said finely ground cereal brans into a liquid selected from the group consisting of water, skim milk, whole milk, and lactoserum, to form a paste, the pH of which is between 6–7 subjecting said paste to the action of the previously released pectinolytic enzymes, converting the thus treated paste into an aerosol, and subjecting said aerosol to a drying step by means of hot air with the aid of a device conventionally used for atomization-drying.

2. A method of treating cereal bran as set forth in claim 1, wherein said suitable maceration liquid consists of water.

3. A method of treating cereal bran as set forth in claim 1, wherein said suitable maceration liquid consists of an aqueous physiological solution.

References Cited

UNITED STATES PATENTS 3,255,015 6/1966 Blanchon ---------------- 99—9
3,258,407 6/1966 Blanchon ------------ 99—9 XR
3,262,783 7/1966 Blanchon ----------- 99—80 XR RAYMOND N. JONES, *Primary Examiner.*

JAMES R. HOFFMAN, *Assistant Examiner.*